(12) United States Patent
Bak et al.

(10) Patent No.: US 7,028,287 B2
(45) Date of Patent: Apr. 11, 2006

(54) METHOD AND APPARATUS FOR FACILITATING COMPACT OBJECT HEADERS

(75) Inventors: Lars Bak, Tranbjcrg (DK); Steffen Grarup, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 762 days.

(21) Appl. No.: 10/122,071

(22) Filed: Apr. 12, 2002

(65) Prior Publication Data
US 2003/0093577 A1 May 15, 2003

Related U.S. Application Data

(60) Provisional application No. 60/332,925, filed on Nov. 14, 2001.

(51) Int. Cl.
*G06F 9/44* (2006.01)
(52) U.S. Cl. .......................... 717/108; 717/116
(58) Field of Classification Search ......... 717/104–121
See application file for complete search history.

(56) References Cited

U.S. PATENT DOCUMENTS

| 6,134,627 | A | 10/2000 | Bak | 711/6 |
| 6,212,608 | B1 | 4/2001 | Bak | 711/152 |
| 6,330,714 | B1 * | 12/2001 | Hicks et al. | 717/131 |

FOREIGN PATENT DOCUMENTS

WO    WO 01/57656    8/2001

OTHER PUBLICATIONS

White et al., "The GC Interface in the EVM1", Sun Microsystems, pp.: i-iii, 1-45, Dec. 1998.*
James O Coplien: "Advanced C++ programming styles and idioms, ISBN: 0-201-54855-0" 1994, Advanced C++ Programming Styles and Idioms, Reading, Addison Wesley, US pp. 58-71 XP002228886 p. 59; figures 3-5, p. 60; figures 3-6, p. 61; figures 3-7.
MIT Scheme: "Object Hashing" MIT Scheme Online Reference, Online! Oct. 27, 1994, XP002080224 Retrieved from the Internet: URL:http://www.swiss.ai.mit.edu/projects/scheme/documentation/scheme_12.html#SEC124 retrieved on Sep. 10, 1998! p. 1, line 3-line 6.

* cited by examiner

*Primary Examiner*—Ted T. Vo
(74) *Attorney, Agent, or Firm*—Park, Vaughan & Fleming, LLP

(57) ABSTRACT

A system that associates an identifier with an instance defined within an object-oriented programming system. The system generates an identifier for the instance and associates a new near object with the instance, wherein the new near object points to a class specifying behavior for the object. The system stores the identifier in the new near object, and sets a class pointer located within a header of the instance to point to the new near object. In this way, the class pointer indirectly points to the class for the object through the new near object. The system can lock the instance to facilitate exclusive access to the instance by copying a near object associated with the instance to a method activation on the execution stack, and setting the class pointer of the instance to point to the copy of the near object on the execution stack.

24 Claims, 6 Drawing Sheets

METHOD AND APPARATUS FOR FACILITATING COMPACT OBJECT HEADERS

RELATED APPLICATION

This application hereby claims priority under 35 U.S.C. §119 to U.S. Provisional Patent Application No. 60/332,925, filed on Nov. 14, 2001, entitled "Improving Performance In Virtual Machines," by inventors Lars Bak, Jacob R. Andersen, Kasper V. Lund and Steffen Grarup.

BACKGROUND

1. Field of the Invention

The present invention relates to object-oriented programming systems. More specifically, the present invention relates to a method and an apparatus that facilitates use of compact object headers within an object-oriented programming system.

2. Related Art

The growing popularity of pocket-sized computing devices, such as personal organizers, has lead to the development of a large number of applications for these miniature computing platforms. Unfortunately, memory space is severely constrained within these pocket-sized computing devices. Hence, application developers often take great pains to use as little memory space as possible in writing applications for these pocket-sized computing devices.

Many applications for pocket-sized computing devices are developed using object-oriented programming languages, such as the JAVA™ programming language, that operate on "objects" located within an object heap. Unfortunately, systems that support object-oriented programming languages do not use memory space as efficiently as possible.

In particular, existing object-oriented programming systems typically allocate space within the object header to store an identifier (hash code) for the object. However, this space is typically wasted because only a small fraction of allocated objects actually make use of the object identifier field.

This wasted space is significant because objects tend to be small, often averaging less than 30 bytes in size. Hence, an unused four-byte object identifier within an object header wastes a considerable fraction of the space that is allocated for the average object.

Note that it may be possible to encode the object identifier into another field within the object header. However, doing so requires complicated bit encoding and decoding operations. Furthermore, if the object identifier is encoded with a pointer, the size of the pointer is restricted, which can unnecessarily limit the size of the object heap.

It is also possible to use to the address of the object as the object identifier. However, doing so limits the system's ability to relocate the object during garbage collection operations, which can lead to fragmentation of the memory space within the object heap.

What is needed is a method and an apparatus that eliminates wasted space that is allocated for object identifiers.

SUMMARY

One embodiment of the present invention provides a system that associates an identifier with an instance defined within an object-oriented programming system. During operation, the system generates an identifier for the instance. The system also associates a new near object with the instance, wherein the new near object points to a class specifying behavior for the object. Next, the system stores the identifier in the new near object, and sets a class pointer located within a header of the instance to point to the new near object. In this way, the class pointer indirectly points to the class for the object through the new near object. Note the header of the instance is more compact because the header does not include space to store the identifier for the object.

In a variation on this embodiment, prior to generating the identifier for the object, the system allocates the instance by allocating space for the instance in an object heap, and setting the class pointer in the header of the instance to point to a prototypical near object of the class. This prototypical near object points to the class for the object. Hence, the class pointer indirectly points to the class for the object through the prototypical near object.

In a variation on this embodiment, associating the new near object with the instance involves generating the new near object by copying the prototypical near object.

In a variation on this embodiment, the system accesses the identifier for the instance indirectly through the class pointer in the header of the instance.

In a variation on this embodiment, generating the identifier for the instance involves generating a hash code for the instance.

In a variation on this embodiment, the system locks the instance to facilitate exclusive access to the instance by copying a near object associated with the instance to a method activation on the execution stack (also referred to as a frame stack), and setting the class pointer of the instance to point to the copy of the near object on the execution stack. In this way, the location of the near object in the execution stack indicates that the instance is locked.

In a further variation, the system unlocks the instance by resetting the class pointer in the header of the instance to point back to the near object, instead of pointing to the copy of the near object in the execution stack.

In a further variation, locking the instance further comprises storing a pointer to the original near object in the method activation along with the copy of the near object to facilitate resetting the class pointer to point back to the near object.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Device

Figure 1:
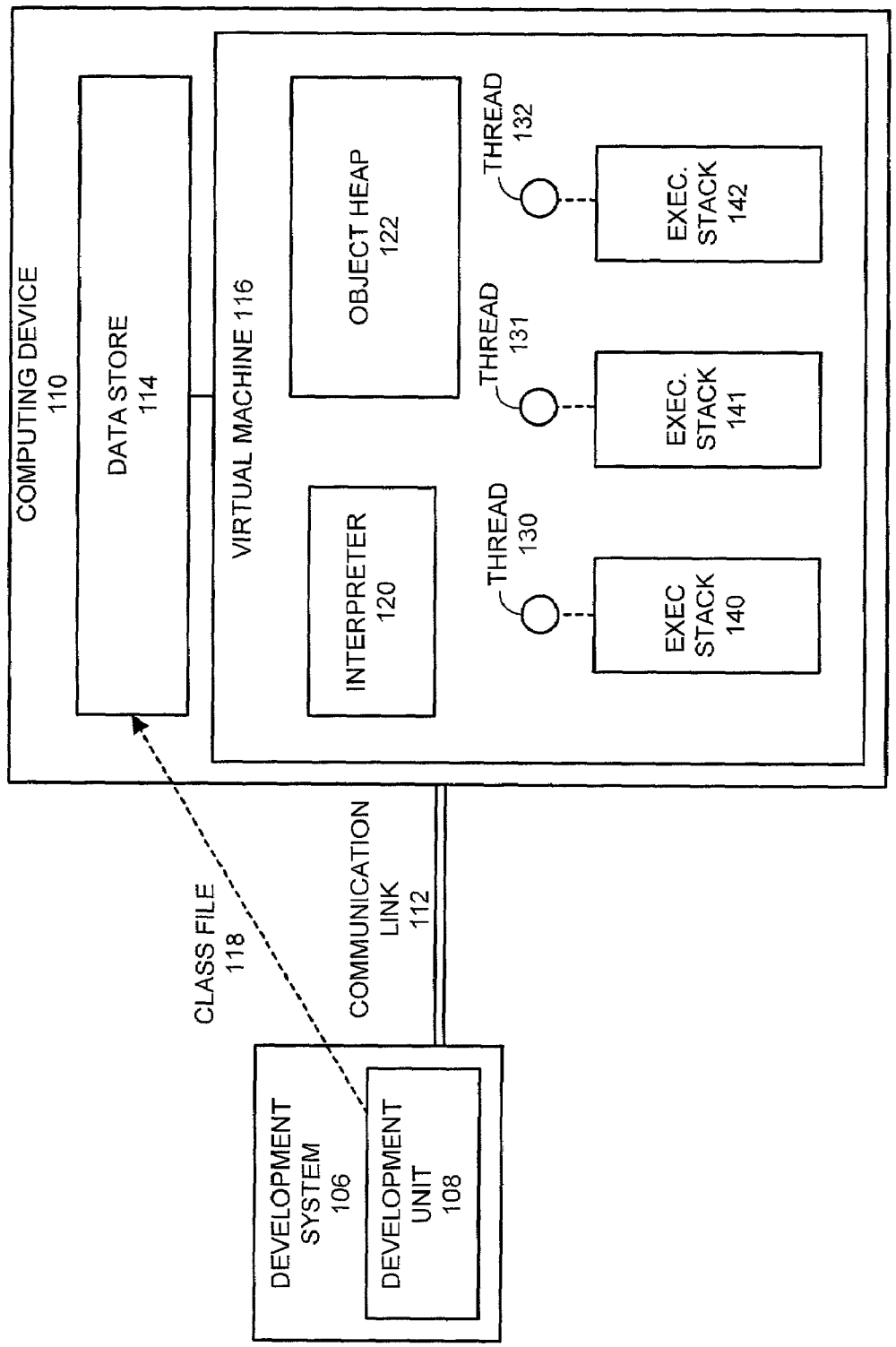
FIG. 1 illustrates a computing device in accordance with an embodiment of the present invention.

FIG. 1 illustrates a computing device 110 coupled to a development system 106 in accordance with an embodiment of the present invention. Development system 106 can generally include any type of computer system, including, but not limited to, a computer system based on a microprocessor, a mainframe computer, a digital signal processor, a portable computing device, a personal organizer, a device controller, and a computational engine within an appliance. Development system 106 contains development unit 108, which includes programming tools for developing platform-independent applications.

Development system 106 is coupled to computing device 110 through a communication link 112. Computing device 110 can include any type of computing device or system including, but not limited to, a mainframe computer system, a server computer system, a personal computer, a workstation, a laptop computer system, a pocket-sized computer system, a personal organizer and a device controller. Computing device 110 can also include a computing device that is embedded within another device, such as a pager, a cellular telephone, a television, an automobile, or an appliance.

Communication link 112 can include any type of permanent or temporary communication channel that may be used to transfer data from development system 106 to computing device 110. This can include, but is not limited to, a computer network such as an Ethernet, a wireless communication network or a telephone line.

Computing device 110 includes data store 114, for storing code and data, as well as a virtual machine 116 for processing platform-independent programs retrieved from data store 114.

During the development process, a class file 118 is created within development unit 108. Class file 118 contains components of a platform-independent program to be executed in computing device 110. For example, class file 118 may include methods and fields associated with an object-oriented class. Next, class file 118 is transferred from development unit 108 through communication link 112, into data store 114 within computing device 110. This allows virtual machine 116 to execute an application that accesses components within class file 118. Note that virtual machine 116 can generally include any type of virtual machine that is capable of executing platform-independent code, such as the JAVA VIRTUAL MACHINE™ developed by SUN Microsystems, Inc. of Palo Alto Calif.

Note that virtual machine 116 includes an interpreter 120, which interprets platform-independent code from data store 114 during program execution. Virtual machine 116 can alternatively execute compiled code. This compiled code is produced by compiling platform-independent code into native code for computing device 110.

Virtual machine 116 also includes object heap 122 for storing objects that are manipulated by code executing on virtual machine 116.

Virtual machine 116 additionally maintains state information for a number of threads 130–132. Note that threads 130–132 are associated with execution stacks 140–142, respectively. Each of these execution stacks stores activation records for methods that are being currently executed by the associated threads.

Object Structure

Figure 2:
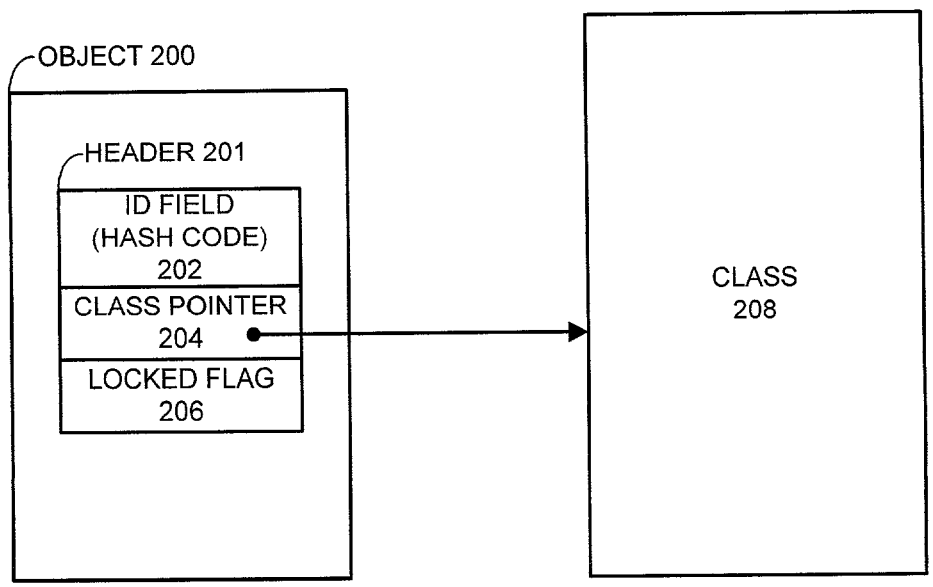
FIG. 2 illustrates the structure of an object.

FIG. 2 illustrates a conventional layout of an object 200 defined within an object oriented programming system. Object 200 includes a header 201, which contains various information associated with object 200, including ID field 202, class pointer 204 and a locked flag 206. This information can be used to satisfy certain requirements for an object.

For example, there are a number of requirements for a Java object including, (1) that the object's class can be retrieved (java.lang.Object.getClass); (2) that the object can be synchronized; and (3) that an immutable hash code is provided (java.lang.Object.hashCode).

The information in object header 200 can be used to satisfy these requirements as follows. (1) The object's class can be retrieved through class pointer 204, which points to class 208 for object 200. (2) The object can be locked for synchronization purposes by setting locked flag 206. (3) Finally, a hash code that identifies object can be stored in ID field 202.

However, note that ID field 202 and locked flag 206 are often unused. Hence, the space allocated for ID field 202 and locked flag 206 is typically wasted.

Storing Identifier in Near Object

Figure 3A:
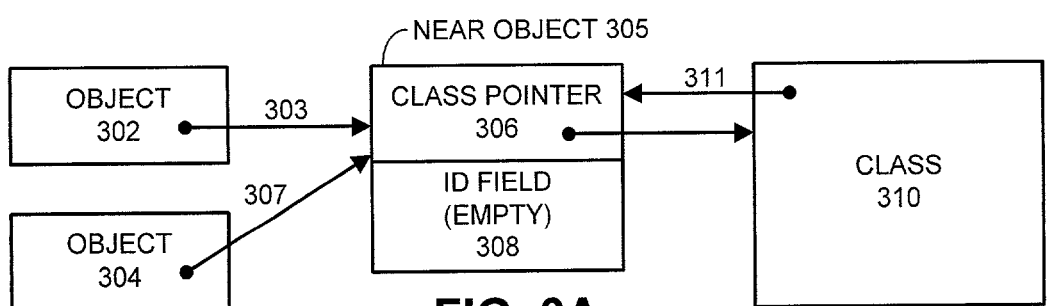
FIG. 3A illustrates a near object in accordance with an embodiment of the present invention.

FIG. 3A illustrates the use of a near object in accordance with an embodiment of the present invention. In the embodiment illustrated in FIG. 3, an object 302 with no non-static fields contains a single pointer 303 that points to its near object 305. Near object 305 in turn points to class 310, which contains the behavior for object 302. Note that when a class 310 is created, a prototypical near object 305 for class 310 is also created. Class 310 includes a pointer 311 that points to prototypical near object 305.

Another object 304 illustrated in FIG. 3A also points to near object 305. This illustrates the fact that many objects can point to the prototypical near object 305. Hence, the space consumed by prototypical near object 305 can generally be amortized over a large number of objects. Note that ID field 308 for near object 305 is empty because neither object 302 or 304 is presently associated with an identifier.

Figure 3B:
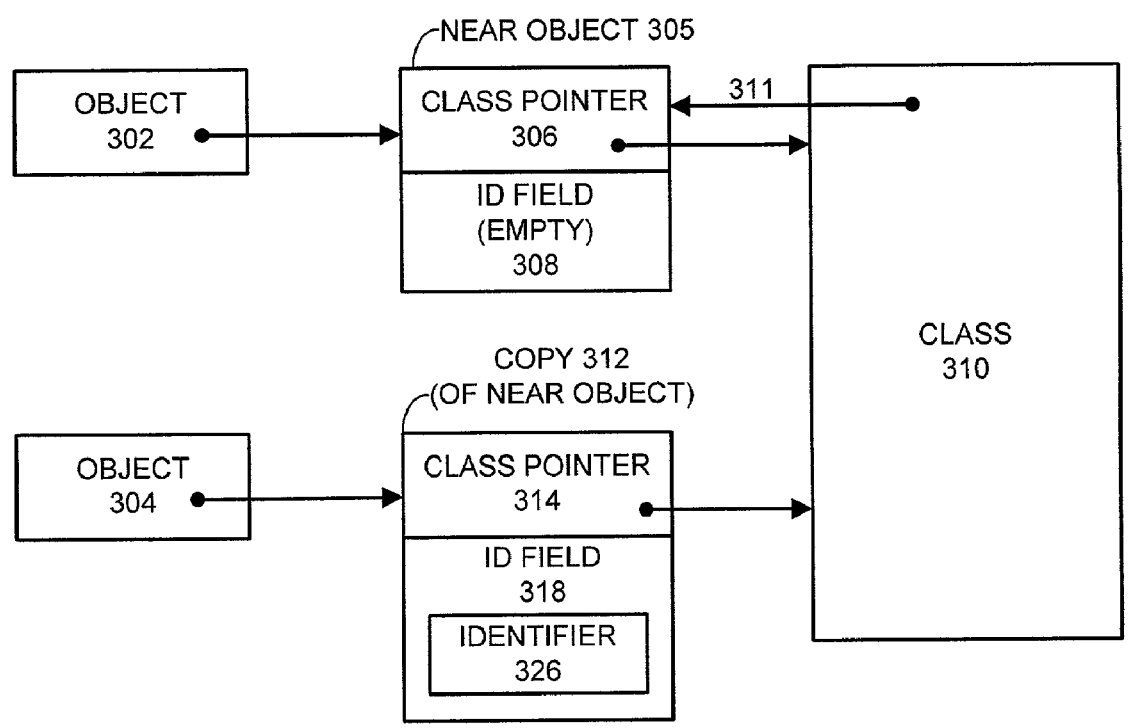
FIG. 3B illustrates the use of a near object to store an identifier in accordance with an embodiment of the present invention.

FIG. 3B illustrates the use of a near object to store an identifier in accordance with an embodiment of the present invention. When a method is invoked to assign an identifier to object 304, a number of actions take place. First, a copy 312 is created from near object 305, and an identifier (hash code) 326 is created for object 304. Next, the pointer in object 304 is set to point to copy 312 instead of near object 305, and identifier 326 is stored within ID field 318 in copy 312. In other words, when identifier 326 is assigned to object 304, object 304 gets its own private near object 312.

In this way, space is allocated for the identifier 326 for object 304 only when it is needed.

Note that the use of a near object between the object and its class can greatly reduce the footprint for the object heap. This is due to the fact that objects on average are small and only a small fraction of allocated objects ever have identifiers assigned to them.

Object Locking

Figure 4:
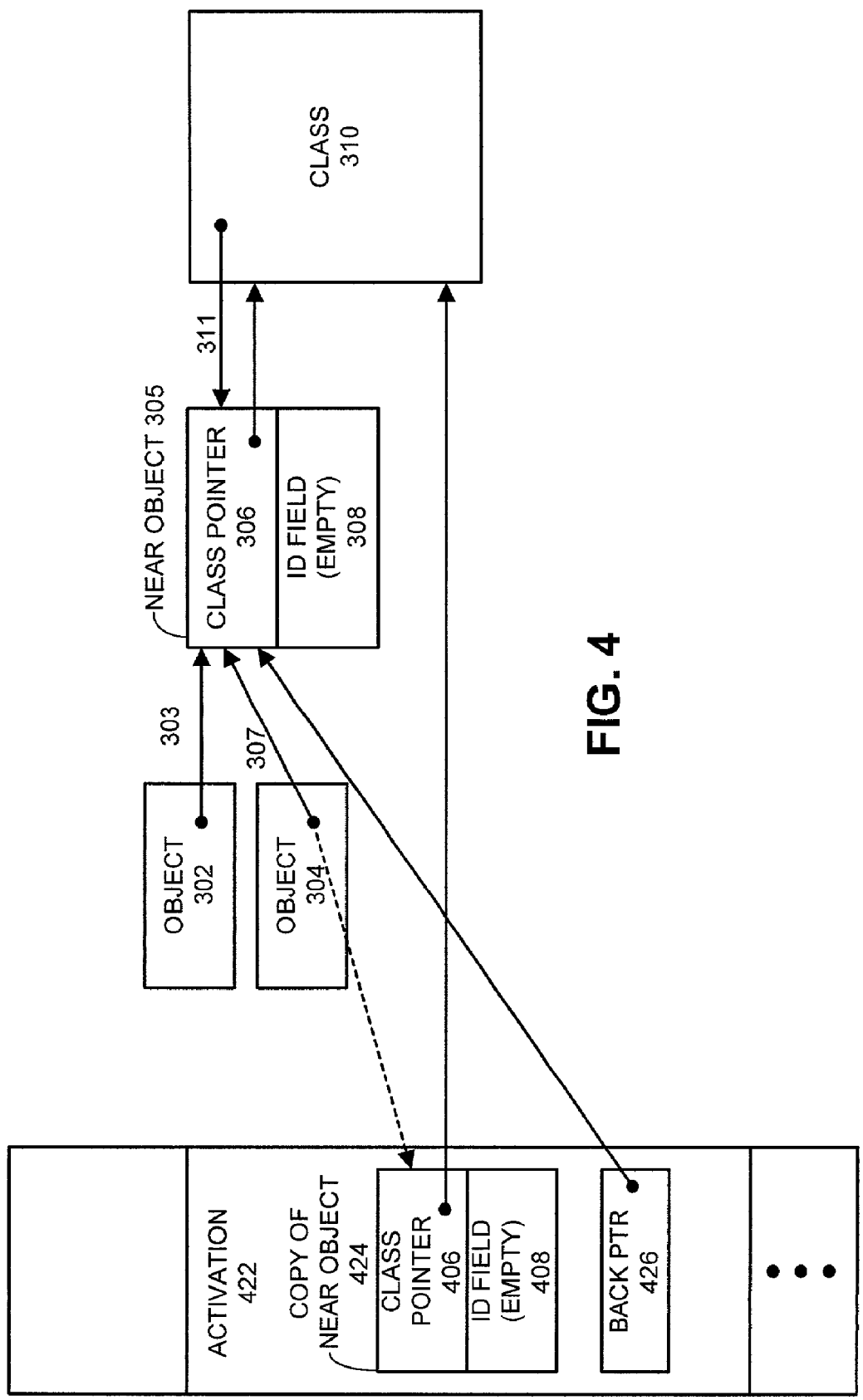
FIG. 4 illustrates the process of locking an object by moving an associated near object into an activation record on the execution stack in accordance with an embodiment of the present invention.

FIG. 4 illustrates the process of locking an object by copying the associated near object into an activation record on the execution stack in accordance with an embodiment of the present invention. As in the example illustrated in FIG. 3A, objects 302 and 304 contain pointers 303 and 307 that point to near object 305, which in turn contains a class pointer 306, which points to class 310. In order to lock an object 304, a copy 424 of its near object 305 is placed in activation record 422 associated with the currently executing method on execution stack 420. A back pointer 426 within activation record 422 points back to near object 305. The pointer 307 within object 304 is then set to point to the copy 424 of the near object located within execution stack 420, as is indicated by the dashed line.

The system can subsequently determine whether object 304 is locked by examining the object's pointer to see if the corresponding near object is located in execution stack 420 or not.

Note that object 304 can be subsequently unlocked by resetting the pointer within object 304 to point back to near object 305. Also note that an ID can potentially be generated for object 304 while object 304 is locked.

Object Allocation

Figure 5:
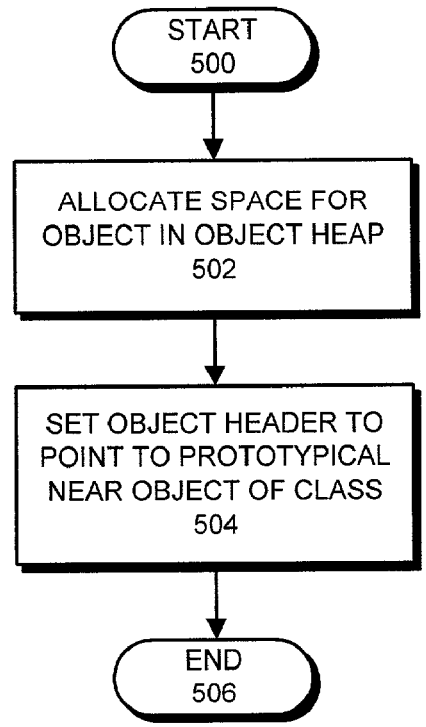
FIG. 5 is a flow chart illustrating the process of allocating an object in accordance with an embodiment of the present invention.

FIG. 5 is a flow chart illustrating the process of allocating an object 304 in accordance with an embodiment of the present invention. The system first allocates space for object 304 in the object heap 122 (step 502). Next, the system sets a pointer in the object's header to point to the prototypical near object 305 of the object's class 310 (step 504).

Associating an Identifier with an Object

Figure 6:
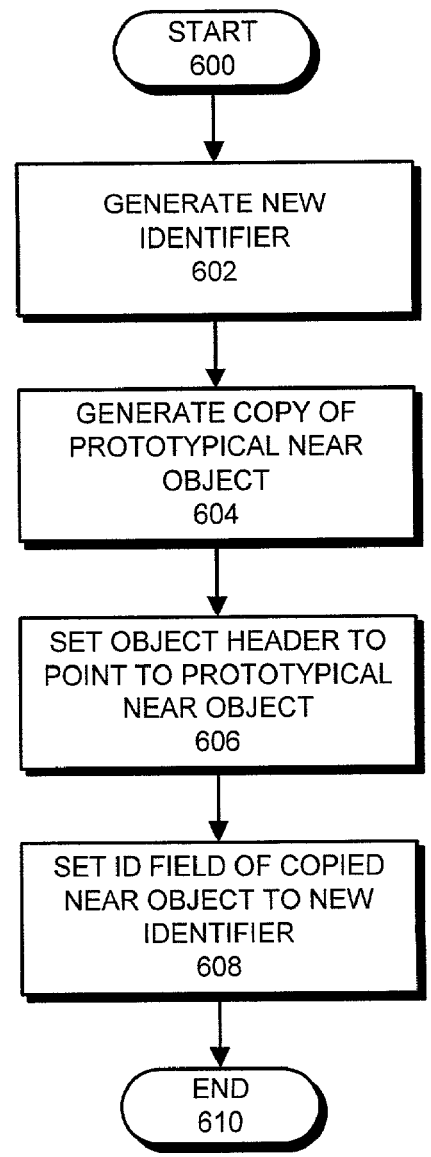
FIG. 6 is a flow chart illustrating the process of associating an identifier with an object in accordance with an embodiment of the present invention.

FIG. 6 is a flow chart illustrating the process of associating an identifier 326 with an object 304 in accordance with an embodiment of the present invention. The system first generates the new identifier (hash code) 326 for object 304 (step 602). This can be accomplished through use of any one of a number of well-known techniques for generating identifiers. The system also generates a copy 312 of prototypical near object 305 (step 604).

Next, the system sets the header of object 304 to point to copy 312 (step 606), and also sets ID field 318 of the copy 312 to the new identifier 326 (step 608).

Process of Locking an Object

Figure 7:
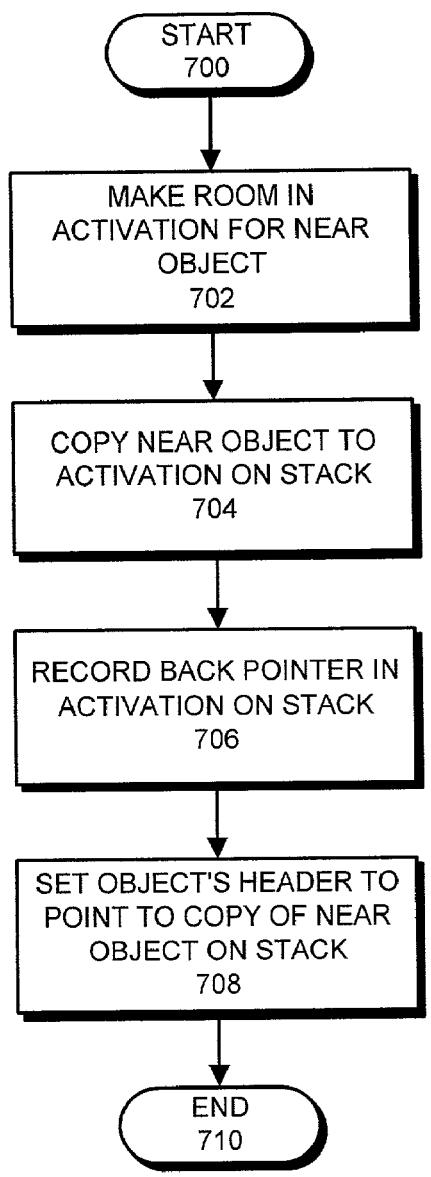
FIG. 7 is a flow chart illustrating the process of locking an object in accordance with an embodiment of the present invention.

FIG. 7 is a flow chart illustrating the process of locking an object 304 in accordance with an embodiment of the present invention. The system first makes space in activation record 422 for the near object 305 that is associated with object 304 (step 702). This can be done ahead of time when the structure of activation record 422 is first determined. Next, a copy 424 of the near object 305 is copied to activation record 422 (step 704). The system also records a back pointer 426 in activation record 422 (step 706). Note that back pointer 426 points back to the original near object 305. Next, the system sets the object's header to point to the copy 424 of the near object on execution stack 420 (step 708). This facilitates resetting the pointer in object 304 to point back to near object 305 when object 304 is unlocked.

Process of Unlocking an Object

Figure 8:
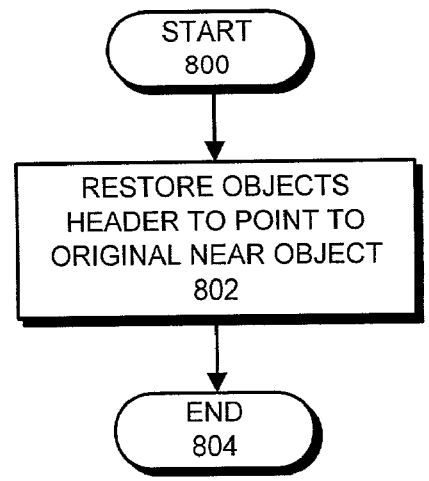
FIG. 8 is a flow chart illustrating the process of unlocking an object in accordance with an embodiment of the present invention.

FIG. 8 is a flow chart illustrating the process of unlocking an object in accordance with an embodiment of the present invention. The system simply restores the object's pointer to point back to near object 305 (step 802). Note that a pointer to near object 304 is conveniently available in back pointer 426.

Note that the present invention fulfills the previously listed requirements for Java objects. (1) An object's class can be retrieved by first retrieving the near object and then the class. (2) Object locking is accomplished by moving the near object to the execution stack of the thread. Moving the near object back to the object heap unlocks the object. (3) The first time the method hashCode is invoked on the object it gets its own near object where the hash code is stored. Retrieving the hash code is simply a matter of reading the hash code field in the near object.

Although the present invention is described in the context of the Java programming language, it is not meant to be limited to the Java programming language. The present invention can generally be applied to all object-oriented systems where objects are associated with information, such as an identifier, that is rarely assigned to the objects.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for associating an identifier with an instance defined within an object-oriented programming system, comprising:

generating an identifier for the instance;

associating a new near object with the instance, wherein the new near object is separate from a header of the instance, and wherein the new near object points to a class specifying behavior for the object;

storing the identifier in the new near object;

setting a class pointer located within the header of the instance to point to the new near object, so that the class pointer indirectly points to the class for the object through the new near object;

whereby the header of the instance is more compact because the header does not include space to store the identifier for the object.

2. The method of claim 1, wherein prior to generating the identifier for the object, the method further comprises allocating the instance by:

allocating space for the instance in an object heap; and setting the class pointer in the header of the instance to point to a prototypical near object of the class, wherein the prototypical near object points to the class for the object, so that the class pointer indirectly points to the class for the object through the prototypical near object.

3. The method of claim 2, wherein associating the new near object with the instance involves generating the new near object by copying the prototypical near object.

4. The method of claim 1, further comprising accessing the identifier for the instance indirectly through the class pointer in the header of the instance.

5. The method of claim 1, wherein generating the identifier for the instance involves generating a hash code for the instance.

6. The method of claim 1, wherein the method further comprises locking the instance to facilitate exclusive access to the instance by:
    copying a near object associated with the instance to a method activation on an execution stack; and
    setting the class pointer of the instance to point to the copy of the near object on the execution stack;
    whereby the location of the near object in the execution stack indicates that the instance is locked.

7. The method of claim 6, further comprising unlocking the instance by resetting the class pointer in the header of the instance to point back to the near object, instead of pointing to the copy of the near object in the execution stack.

8. The method of claim 7, wherein locking the instance further comprises storing a pointer to the near object in the method activation along with the copy of the near object to facilitate resetting the class pointer to point back to the near object.

9. A computer-readable storage medium storing instructions that when executed by a computer cause the computer to perform a method for associating an identifier with an instance defined within an object-oriented programming system, the method comprising:
    generating an identifier for the instance;
    associating a new near object with the instance, wherein the new near object is separate from a header of the instance, and wherein the new near object points to a class specifying behavior for the object;
    storing the identifier in the new near object;
    setting a class pointer located within the header of the instance to point to the new near object, so that the class pointer indirectly points to the class for the object through the new near object;
    whereby the header of the instance is more compact because the header does not include space to store the identifier for the object.

10. The computer-readable storage medium of claim 9, wherein prior to generating the identifier for the object, the method further comprises allocating the instance by:
    allocating space for the instance in an object heap; and
    setting the class pointer in the header of the instance to point to a prototypical near object of the class, wherein the prototypical near object points to the class for the object, so that the class pointer indirectly points to the class for the object through the prototypical near object.

11. The computer-readable storage medium of claim 10, wherein associating the new near object with the instance involves generating the new near object by copying the prototypical near object.

12. The computer-readable storage medium of claim 9, wherein the method further comprises accessing the identifier for the instance indirectly through the class pointer in the header of the instance.

13. The computer-readable storage medium of claim 9, wherein generating the identifier for the instance involves generating a hash code for the instance.

14. The computer-readable storage medium of claim 9, wherein the method further comprises locking the instance to facilitate exclusive access to the instance by:
    copying a near object associated with the instance to a method activation on an execution stack; and
    setting the class pointer of the instance to point to the copy of the near object on the execution stack;
    whereby the location of the near object in the execution stack indicates that the instance is locked.

15. The computer-readable storage medium of claim 14, wherein the method further comprises unlocking the instance by resetting the class pointer in the header of the instance to point back to the near object, instead of pointing to the copy of the near object in the execution stack.

16. The computer-readable storage medium of claim 15, wherein locking the instance further comprises storing a pointer to the near object in the method activation along with the copy of the near object to facilitate resetting the class pointer to point back to the near object.

17. An apparatus for associating an identifier with an instance defined within an object-oriented programming system, comprising:
    an identifier generation mechanism that is configured to generate an identifier for the instance;
    an association mechanism that is configured to associate a new near object with the instance, wherein the new near object is separate from a header of the instance, and wherein the new near object points to a class specifying behavior for the object;
    a storage mechanism that is configured to store the identifier in the new near object;
    a setting mechanism that is configured to set a class pointer in the header of the instance to point to the new near object, so that the class pointer indirectly points to the class for the object through the new near object;
    whereby the header of the instance is more compact because the header does not include space to store the identifier for the object.

18. The apparatus of claim 17, wherein the apparatus further comprises an object allocation mechanism that is configured to:
    allocate space for the instance in an object heap; and to
    set the class pointer located within the header of the instance to point to a prototypical near object of the class, wherein the prototypical near object points to the class for the object, so that the class pointer indirectly points to the class for the object through the prototypical near object.

19. The apparatus of claim 18, wherein the association mechanism is configured to generate the new near object by copying the prototypical near object.

20. The apparatus of claim 17, further comprising an access mechanism that is configured to access the identifier for the instance indirectly through the class pointer in the header of the instance.

21. The apparatus of claim 17, wherein the generation mechanism is configured to generate a hash code for the instance.

22. The apparatus of claim 17, wherein the apparatus further comprises an object locking mechanism that is configured to:
    copy a near object associated with the instance to a method activation on an execution stack; and to
    set the class pointer of the instance to point to the copy of the near object on the execution stack;

whereby the location of the near object in the execution stack indicates that the instance is locked.

23. The apparatus of claim 22, further comprising an object unlocking mechanism that is configured to reset the class pointer in the header of the instance to point back to the near object, instead of pointing to the copy of the near object in the execution stack.

24. The apparatus of claim 23, wherein the object locking mechanism is configured to store a pointer to the near object in the method activation along with the copy of the object to facilitate resetting the class pointer to point back to the near object.

* * * * *